United States Patent [19]

Suzuki et al.

[11] 4,138,340
[45] Feb. 6, 1979

[54] ENDLESS BELT CONVEYOR FOR COLLECTING FLOATING MATTER FROM WATER SURFACE

[75] Inventors: Masao Suzuki, Miura; Tsutomu Yamajo, Yokohama, both of Japan

[73] Assignees: Bridgestone Tire Company Limited; Japan Ships Machinery Development Association, both of Tokyo, Japan

[21] Appl. No.: 814,076

[22] Filed: Jul. 8, 1977

[30] Foreign Application Priority Data

Jul. 8, 1976 [JP] Japan .................................. 51-80344
Nov. 8, 1976 [JP] Japan ........................... 51-148935[U]

[51] Int. Cl.² ............................................. B01D 33/02
[52] U.S. Cl. ..................................... 210/396; 198/698; 210/159; 210/400; 210/DIG. 25
[58] Field of Search ..................... 198/342, 698, 817; 210/155, 158, 159, 160, 242 S, 400, DIG. 25, 396

[56] References Cited

U.S. PATENT DOCUMENTS

| 527,722 | 10/1894 | Sargent et al. | 198/698 |
| 881,908 | 3/1908 | Demarest | 198/698 |
| 1,331,935 | 2/1920 | Lee | 210/159 X |
| 1,430,198 | 9/1922 | Stebler | 210/158 |
| 3,057,528 | 10/1962 | Cole et al. | 198/817 X |
| 3,306,424 | 2/1967 | Fahrenbach | 198/698 |
| 3,314,545 | 4/1967 | Grabbe et al. | 210/242 S |
| 3,700,108 | 10/1972 | Richards | 210/242 S |
| 3,907,685 | 9/1975 | Aramaki et al. | 210/400 X |

FOREIGN PATENT DOCUMENTS

494941  6/1954  Italy ........................................ 198/817

Primary Examiner—Robert H. Spitzer
Attorney, Agent, or Firm—Sughrue, Rothwell, Mion, Zinn and Macpeak

[57] ABSTRACT

An endless belt conveyor for collecting floating matter, particularly highly viscous oil lumps from the water surface is disclosed. The endless belt conveyor extends between a pair of pulleys, one of which being located above water level and the other pulley being located beneath water level, and comprises (1) a pair of driving bands located at widthwise ends of the conveyor, (2) a plurality of connection plates fixed to the driving bands at a given interval, (3) a plurality of projections provided outwardly on the upper surface of each connection plate, (4) a plurality of sleeves provided on the lower surface of each connection plate, and (5) a plurality of flexible ropes passing through the sleeves and extending between the pulleys.

2 Claims, 13 Drawing Figures

FIG_3a
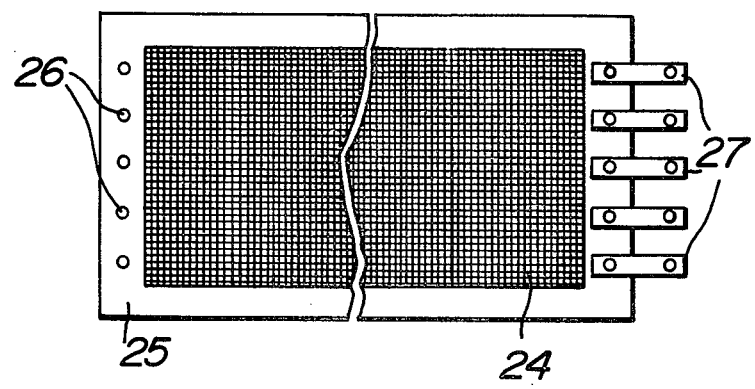
FIG_3b
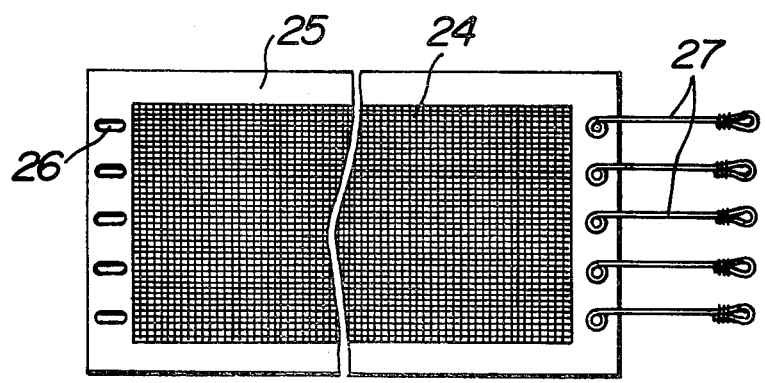

FIG_6a
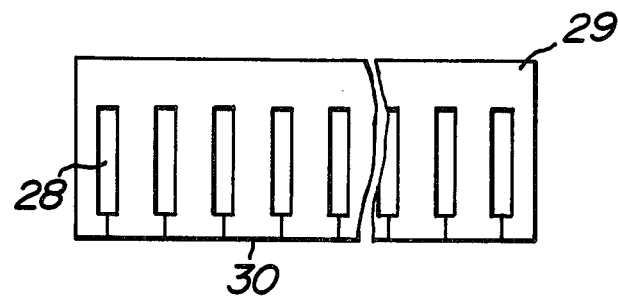
FIG_6b
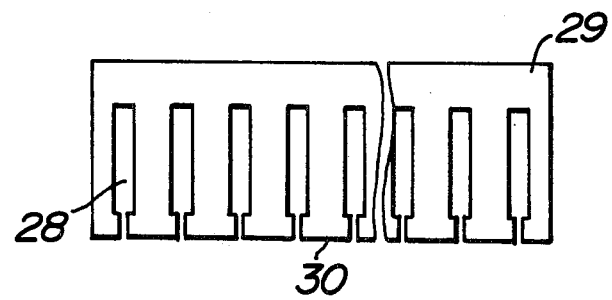
FIG_6c
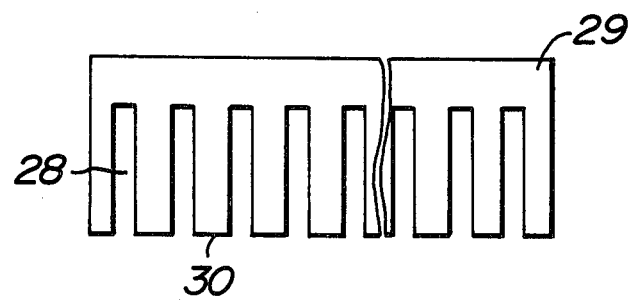

FIG_7a
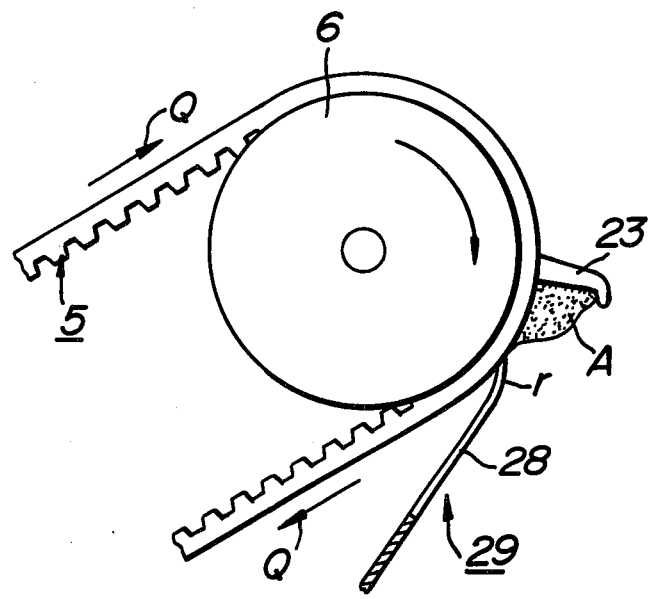
FIG_7b
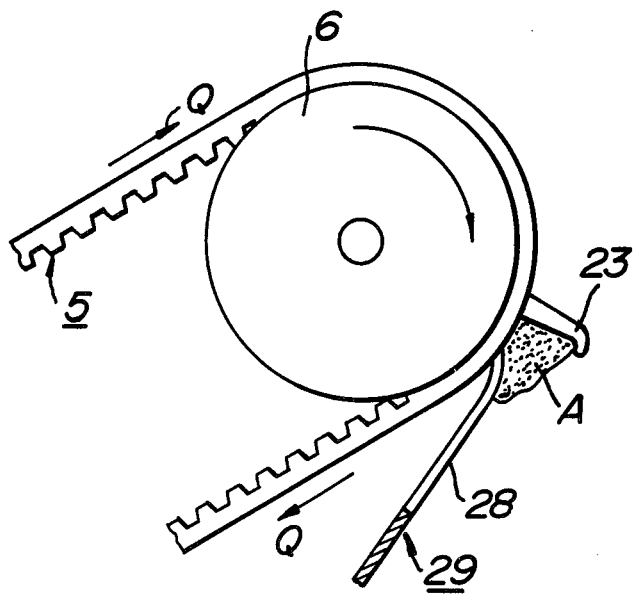

ENDLESS BELT CONVEYOR FOR COLLECTING FLOATING MATTER FROM WATER SURFACE

The present invention relates to an improvement of an endless belt conveyor useful for selectively collecting dusts, highly viscous drift oil and the like from water surface.

In recent years, accidents causing oil pollution by leaking oil from a tanker or the like onto water surface have frequently occurred. In order to solve such oil pollution problems, various devices have been developed and used for recovering the leaked oil from water surface. However, it has been confirmed that almost all of these conventional devices are effective for the recovery of drift oil having a viscosity of not more than about 20,000 centipoises, and are not readily applied to the recovery of drift oil having a viscosity of more than about 20,000 centipoises, particularly more than 40,000 centipoises.

From recent oil accidents, it has been found that the leaked oil exhibit different properties due to various factors such as temperature of sea water, kind of oil, sea microorganisms and the like, and particularly the viscosity of the oil rapidly increases in local portions of the oil leaked area. Thus, in the recovery of the drift oil having a considerably increased viscosity of, for example, more than 20,000 centipoises, the recovery efficiency is considerably lowered. This is due to the fact that the highly viscous oil lumps and dusts and foreign matter accompanied therewith adhere to an inner wall of a piping system or block the piping system.

It is, therefore, an object of the present invention to provide an endless belt conveyor for collecting floating matter from water surface wherein highly viscous oils having a viscosity of more than about 20,000 centipoises and dusts can easily be separated from the floating matter by properly selecting and using a filtering screen in accordance with the properties of the floating matter without obstructing the recovery of low-viscosity oil at a separate stage.

According to the present invention, a filtering screen device used for previously separating dusts and highly viscous oil lumps from low-viscosity oil in the drift oil comprises a belt conveyor with a proper filtering stitch serving to remove the dusts and oil lumps depending upon the size and kind of the dust and the difference of viscosity in the highly viscous oil.

In the recovery of drift oils leaked from a tanker or coastal oil storage equipment onto water surface, a ship moving toward the drift oil region or an aquatic equipment receiving a flow of the drift oil region is generally used. In any case, it is necessary to provide a water passage guiding the water flow relative to the ship or the aquatic equipment, which is a flow of a superficial layer at an area defining the drift oil region to a given width. Such relative water flow is caused by either cruising of the ship or by tidal current and the like in case of the aquatic equipment.

In the water passage there is preferably provided a suitable means for increasing a layer thickness of the drift oil. Furthermore, a device for collecting low-viscosity oil under an influence of suction with a pump is arranged at the rear portion of the water passage, and also a filtering device for previously separating floating matters such as dusts, highly viscous oils and the like, which obstruct the suction recovery, from the low-viscosity oil is arranged behind the water passage and at the front portion of the collecting device. At the filtering device, there is usually used a belt conveyor comprising a pair of pulleys and an endless netted metal or rubber belt screen closely engaged therewith, wherein one of the pulleys is located above water level and the other pulley is located beneath water level so as to circularly drive the screen above and below water level.

However, when the stitch of the screen is not adapted to remove the dusts and highly viscous oil lumps, the load applied to the filtering device becomes excessive or the operation of the collecting device is not smooth, so that there is a danger that an urgent recovery of the drift oil will be retarded.

According to the present invention, the performance of such conveyor can be improved by properly changing and selecting the belt screen in accordance with the properties of the foreign matters such as dust and highly viscous oil.

That is, the present invention consists in an endless belt conveyor for collecting floating matter from water surface. The conveyor endlessly extends between a pair of pulleys, one of which being located above water surface and the other pulley being located beneath water level. The invention further comprises (1) a pair of driving bands located at widthwise ends of the conveyor and synchronously driven together with the pulleys, (2) a plurality of connection plates each extending between the driving bands perpendicular to the driving direction of the band and fixed at each end to the bands at a given interval in the driving direction, (3) a plurality of projections provided outwardly on the upper surface of each of the connection plates at a given interval, (4) a plurality of sleeves provided on the lower surface of each of the connection plates at a given interval toward the driving direction, and (5) a plurality of flexible ropes each passing through the sleeve and endlessly extending between the pulleys.

In a preferred embodiment of the present invention, the endless belt conveyor further comprises a rectangular filtering screen having a width substantially equal to the distance between the driving bands, both ends of the screen being resiliently engaged with the projections in a detachable manner so as to locally or entirely cover the conveyor. In another embodiment of the present invention, a sprocket wheel is used as the pulley and a flexible wrapping band, which is engaged with sprocket teeth of the sprocket wheel, is used as the driving band. In a further embodiment of the present invention, a comb-type wiper having a plurality of notches with a size corresponding to the length and width of the projection, is provided in a tangential direction of the endless belt conveyor wound around the pulley located above water level so as to contact a top end of the wiper with the conveyor, whereby the floating matter can completely be collected.

That is, the present invention makes it possible to change the structure of the endless belt conveyor in accordance with the kind of floating matter to be collected, so that the complete recovery of the floating matter can easily be achieved. For example, if it is intended to collect the floating matter having a relatively large size such as dusts and the like, a plurality of flexible ropes are used by increasing or decreasing the number of ropes in accordance with the size of the floating matter without using a filtering screen. Furthermore, if it is intended to selectively collect the floating matter having a fairly small size, the filtering screen is endlessly extended between the pulleys by engaging both ends of the screen with the projections provided on each connection plate in a detachable manner. In the latter case, the number of the flexible ropes used can be reduced to a minimum because these ropes act only to support the screen.

As the filtering screen, a screen unit extending between the connection plates may be used in addition to a chain of screen units endlessly extending between the pulleys. In any case, a plurality of holes are formed on both ends of the screen or a frame covered with the screen so as to be engaged with the projections in a detachable manner. If the material of the frame is poor in its stretchability, a resilient strip for effectively absorbing the tension may be provided on at least one end of the frame.

Moreover, when floating matter is entangled around the projections or adhered to the conveyor due to its viscosity, the comb-type wiper located at the particular position separates floating matter from the conveyor, so that complete recovery of the floating matter can easily be achieved.

The invention will now be described with reference to the accompanying drawings, wherein:

FIGS. 3a and 3b are plan views, partly broken away, of the filtering screen to be used in the present invention, respectively;

FIG. 4 is a sectional view of a connection plate constituting a part of the endless belt conveyor according to the present invention and engaged with the filtering screen shown in FIG. 3a;

FIGS. 6a–6c are diagrammatically front views of various embodiments of a comb-type wiper to be used in the present invention, respectively; and FIGS. 7a–7d are partly enlarged schematic views showing sequential steps of collecting and removing floating matter by means of the endless belt conveyor according to the present invention, respectively.

Like parts are designated by like numerals and like symbols throughout the different figures of the drawing.

The present invention will be explained with respect to a ship for recovering petroleum which has leaked onto water surface.

Figure 1:
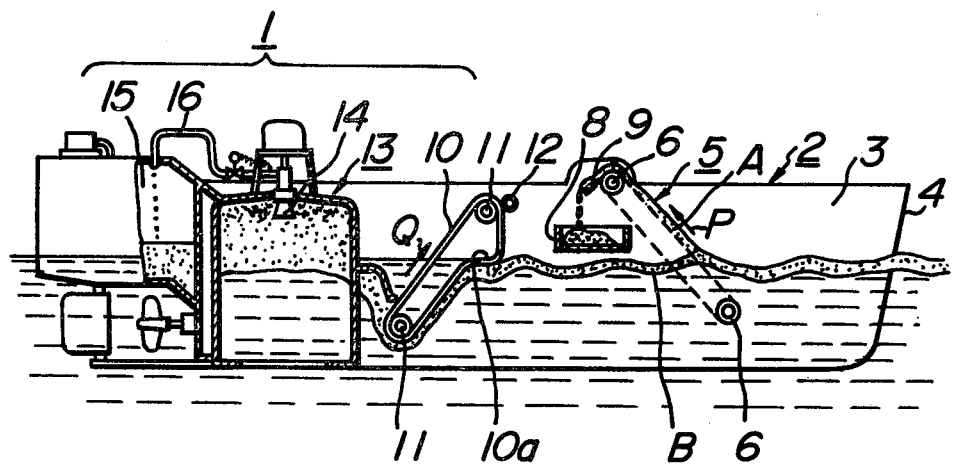
FIG. 1 is a vertical sectional view of a ship provided with the endless belt conveyor for collecting floating matter from water surface according to the present invention.

Referring to FIG. 1, an endless belt conveyor according to the present invention is arranged in front of an oil recovering device mounted on a floating body 2 of the ship. Instead of the ship, a stationary equipment may be disposed in place opposing to a water flow direction of from right to left shown in FIG. 1. In any case, a water passage 3 is provided in the floating body 2 so as to cause water flow into the body. For instance, the ship may be made opened in a substantial U-shaped ahead to provide the water passage 3.

In the passage 3 behind its inlet opening 4 an endless belt conveyor 5 is arranged for collecting floating matter from water surface according to the present invention, which serves to pick up highly viscous oil lumps having a viscosity of more than about 20,000 centipoises, particularly more than 40,000 centipoises and dusts (hereinafter referred to as coarse floating matter A). That is, the endless belt conveyor 5 has a width equal to that of the passage 3 and is extended between a pair of pulleys 6, 6 and circularly driven in a direction of picking up the coarse floating matter A, i.e. a direction shown by an arrow P by means of a suitable driving means (not shown). One of the pulleys 6 is located above water level and the other pulley is located beneath water level, an axis extending through the centers of both pulleys being inclined from a relative direction of water flow in the passage 3 by an obtuse angle. In the conveyor 5, the size of stitch is variable in order to pass a low-viscosity oil B and to selectively pick up the coarse floating matter A in accordance with the properties thereof.

When the inclination obtuse angle of the conveyor 5 is large, the pick up performance is good, but the space occupied by the conveyor becomes considerably large. Therefore, it is desirable to make the inclination obtuse angle small without damaging the pick up performance. For this purpose, it is necessary to arrange a plurality of pick-up projections on the surface of the conveyor as mentioned below.

The coarse floating matter A picked up by the conveyor 5 falls into a reservoir 8 fixed to the floating body at a position slightly lower than the upper pulley 6 and then may be subjected to a post-treatment. Moreover, a wiper 9 is used for peeling off the floating matter A adhered to the surface of the conveyor 5.

The low-viscosity oil B passed through the conveyor 5 is recovered by the oil recovery device 1 for low-viscosity oil, which is located at the rear portion of the water passage 3. The oil recovery device 1 may be any type capable of effectively recovering the low-viscosity oil B having a viscosity of not more than 40,000 centipoises, particularly not more than 20,000 centipoises. For convenience, the present invention will be described below with reference to the oil recovery device as shown in FIG. 1, which is developed by the inventors and disclosed in U.S. Pat. No. 3,907,685.

The low-viscosity oil B passes through the conveyor 5 in the water passage 3 and arrives at a belt device 10. This belt device 10 comprises an endless belt having the same width as that of the passage 3 and loosely engaging with a pair of pulleys 11, 11 and is driven in a direction shown by an arrow Q by means of a suitable driving means (not shown). In FIG. 1, numeral 12 is a touch roller for ensuring the contacting of the belt with the upper pulley 11. The belt device 10 is so arranged that an axis extending through the centers of both pulleys is inclined from a relative direction of water flow by a given acute angle as a whole. The endless belt has a circumferential length such that the belt loosely engages with the pulleys 11, 11 to form a loosening portion 10a.

When the low-viscosity oil B arrives at such loosening portion 10a, it is sandwiched between the loosening portion 10a and the water surface during the movement of the belt and then pulled downwardly into water along the belt. After the belt is turned upwardly around the pulley 11 located beneath water level, the low-viscosity oil B is separated off from the belt and fed into a separating device 13 located at the rear portion of the water passage 3 together with water accompanied by the oil while floating upwardly. In the separating device 13, the low-viscosity oil B is subjected to a gravity separation to reduce the water content thereof and finally recovered. That is, in the separating device 13, the low-viscosity oil B is separated from water due to the difference of the specific gravity between both the substances. The water is discharged through a bottom opening of the device 13, while the low-viscosity oil B collected in the upper portion of the device 13 is successively transported into a storage tank 15 through a conduit 16 by means of a suction nozzle 14.

Figure 2:
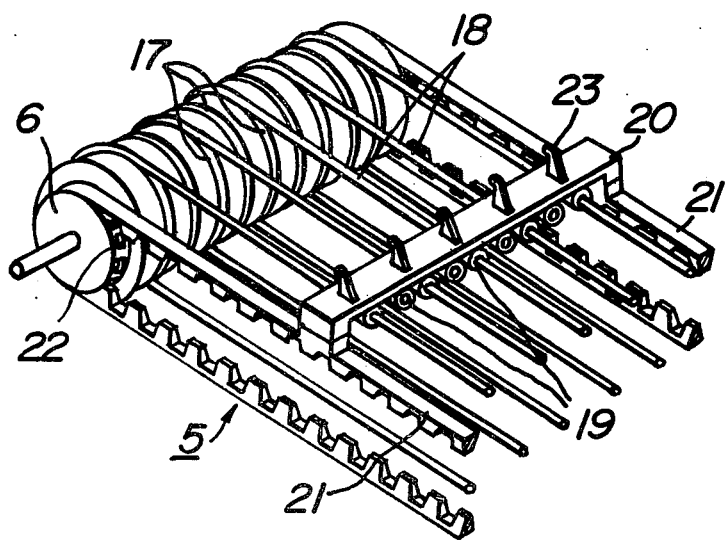
FIG. 2 is a partial perspective view of an embodiment of the endless belt conveyor according to the present invention.

In the endless belt conveyor 5 according to the present invention, as shown in FIG. 2, a plurality of circumferential grooves 17 are formed on the circumferential surface of each of the pulleys 6, 6 at a narrow interval, for example, at a pitch of about 5–15 mm in a longitudinal direction of the pulley 6, i.e. in a widthwise direction of the water passage 3 and a plurality of flexible ropes 18 having a size of about 3–8 mm are extended between the pulleys 6, 6 along the circumferential grooves 17. In this case, the size and number of the ropes used are properly selected in accordance with the properties of the coarse floating matter A to be separated.

For the flexible rope 18, a resilient material such as oil-resistant rubber and the like and fiber rope or wire rope may be used.

The flexible ropes 18 are endlessly extended between the pulleys 6, 6 at predetermined intervals. However, such interval should be made narrow depending upon the kind of the coarse floating matter A. In this case, additional flexible ropes each having at both ends hook joints may be used, if necessary. In FIG. 2 is shown an endless belt conveyor 5, wherein the circumferential grooves 17 are formed on the surface of each of the pulleys 6, 6 at predetermined intervals and the flexible ropes 18 are endlessly extended the pulleys 6, 6 on alternate grooves. Moreover, these flexible ropes 18 pass through a plurality of sleeves 19 secured at a predetermined interval to a lower surface of a connection plate 20, which is arranged in the widthwise direction of the conveyor 5, so as to hold the mutual interval of the ropes.

The sleeve 19 and the connection plate 20, may be made of a flexible and oil-resistant shaped body of rubber, synthetic resins such as soft vinyl chloride, and the like.

It is desirable to drive the flexible ropes 18 all together. For this purpose, as shown in FIG. 2, a pair of synchronous driving bands 21 are endlessly extended between the pulleys 6, 6 and engaged with sprocket teeth 22 formed on both ends of the pulley 6. The upper surface of each driving band 21 is jointed the end of each of the connection plates 20.

Sprocket teeth 22 may be formed on a circumferential surface of a wheel integrally jointed to each end of the pulley 6. Further, the synchronous driving band 21 may be a roller chain made of a sea water resistant material.

Figure 4:
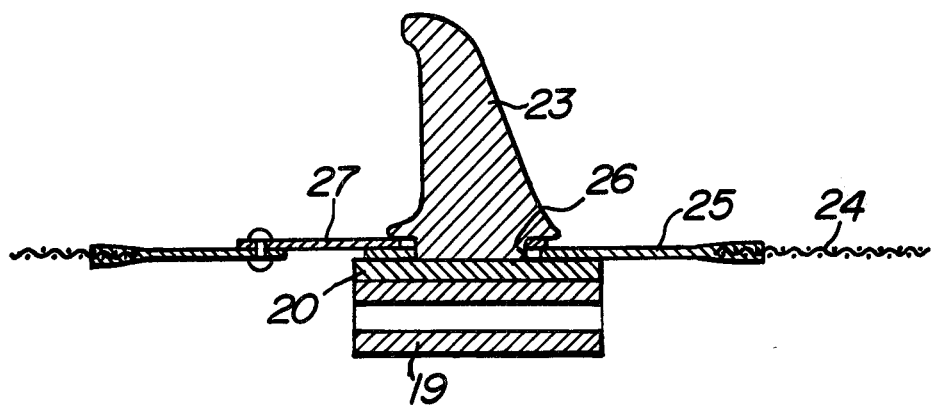

The upper surface of the connection plate 20 have a plurality of projections 23 at given intervals in the lengthwise direction. Such projections 23 act to completely pick up the coarse floating matter A and also serve as a stopper for a filtering screen 24 covering on the whole surface of the conveyor. As shown in FIGS. 3a and 3b, the filtering screen 24 is a screen unit having a length approximately equal to the distance between the adjoining connection plates 20 and fixed at its periphery to a frame 25 having a plurality of holes 26 at its one end and a plurality of resilient stopping strips 27 at the other end. The strip is a rubber band or rubber cord, which is capable of absorbing the tension during the movement of the conveyor 5. As shown in FIG. 4, the attachment of the filtering screen 24 to the conveyor 5 is carried out by putting the holes 26 on the projections 23 in a detachable manner. Moreover, the filtering screen 24 may be a chain of screen units having a plurality of holes 26 in places corresponding to each connection plate 20 provided on the belt.

Another feature of the present invention is to effectively peel off the coarse floating matter A picked up by the conveyor 5 from the projections 23 of the conveyor 5.

Figure 5:
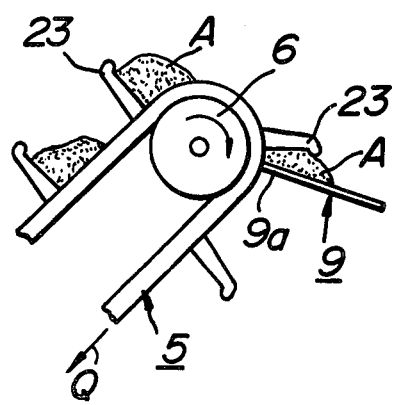
FIG. 5 is a partly enlarged schematic view of the conventional belt device for collecting floating matter.

FIG. 5 shows a wiper device usually used for separating the floating matter A from the conveyor 5, wherein a wiper 9 is so arranged that a top end 9a of the wiper 9 is directed to a center of the pulley 6 located above water level over the width of the conveyor 5. However, when the projections 23 are arranged on the conveyor 5, the floating matter A is sandwiched between the projections 23 and the wiper 9, so that it is very difficult to smoothly move the conveyor 5.

In order to achieve the smooth movement of the conveyor 5, according to the present invention, various embodiments of comb-type wiper 29 as shown in FIGS. 6a to 6c are used. In the wiper 29 are formed a plurality of notches having a size equal to the length and width of the projection 23 at positions corresponding to the arrangement of the projections 23.

As seen from FIGS. 7a to 7d, the comb-type wiper 29 is so arranged that a top end 30 of the wiper 29 is directed to a tangential direction of the endless belt conveyor 5 wound around the pulley 6 located above water level and contacting the belt.

Figure 7C:
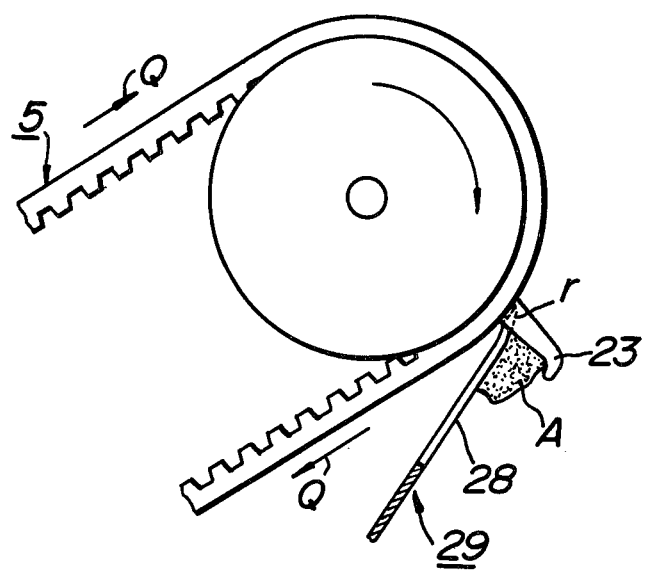
Figure 7D:
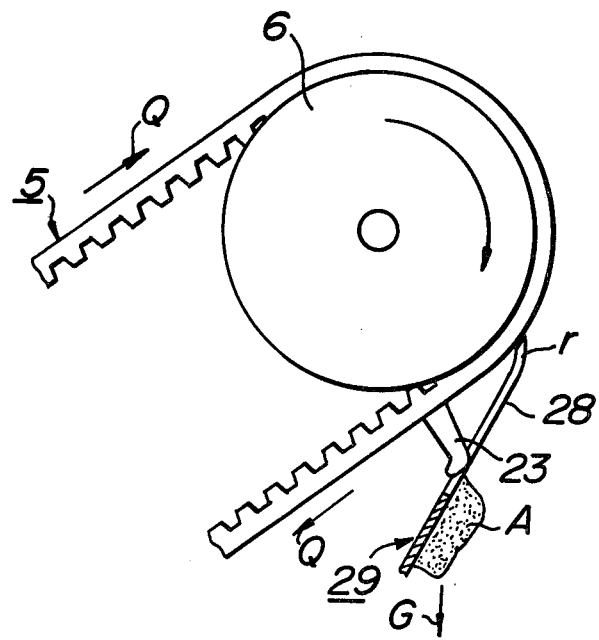

The relationship among the wiper 29, the conveyor 5, the projection 23 and the picked coarse floating matter A is shown in FIGS. 7a to 7d. That is, FIG. 7a shows a state when contacting the coarse floating matter A picked up by the projection 23 with the top end 30 of the wiper 29 and FIGS. 7b to 7d show sequential states when the coarse floating matter A is removed from the projection 23 during the movement of the conveyor 5, respectively.

According to the present invention, since the top end 30 of the wiper 29 is directed to the tangential direction of the upper pulley 6, the coarse floating matter A can be separated and recovered simply. As seen from FIGS. 7a to 7d, the top end 30 of the wiper 29 is located at a position lower than the horizontal plane of the upper pulley 6, so that the coarse floating matter A freely drops downwardly by gravity in a direction shown by an arrow G and as a result, the removal of the coarse floating matter A becomes considerably simple.

The wiper 29 is of a flat plate extending over the width of the conveyor 5. Particularly, it is preferable that the top end of the wiper is slightly bent at a given curvature (r) as shown in FIGS. 7a to 7d. Moreover, the wiper 29 is preferably composed of a flexible material such as rubber, plastics and the like or a resilient material such as spring steel and the like.

The angle of the wiper to the conveyor is not necessarily directed to the tangential direction of the conveyor and may be changed to a certain extent depending upon the kind of the coarse floating matter and also the position of the wiper contacting with the conveyor may be changed.

As mentioned above, the coarse floating matter A is gradually separated from the conveyor without sandwiching between the projections and the wiper because the top end of the wiper is directed to the tangential direction of the conveyor wound around the upper pulley, whereby the conveyor can smoothly be moved.

According to the present invention, the stitch defined by the flexible ropes 18 themselves or the stitch of the filtering screen 24 is optionally selected depending upon the properties of the coarse floating matter A to be recovered, so that highly viscous oil lumps and dusts contained in the floating matter can effectively be separated so as to smoothly effect the suction recovery of low-viscosity oil by the oil recovery device.

What is claimed is:

1. In an endless belt conveyor for selectively collecting high viscosity oil or coarse floating matter as in a drift oil recovery system, said conveyor having a pair of pulleys, one of which pulleys being located above water level and the other pulley being located beneath water level, a pair of driving bands each extending endlessly between said pulleys at widthwise ends of said pulleys and synchronously driven together with said pulleys, a plurality of connection plates each extending between said driving bands perpendicular to the driving direction of said band and fixed at each end to said bands at a given interval in the driving direction, a plurality of projections provided outwardly on an upper surface of each of said connection plates at a given interval, and a plurality of flexible ropes endlessly extending between said pulleys at a given interval, the improvement comprising,
   (a) a plurality of sleeves provided on a lower surface of each of said connection plates at a given interval toward the driving direction,
   (b) said ropes comprising a plurality of resilient rubbery bodies, one of said ropes passing freely through each of said sleeves,
   (c) a rectangular filtering screen having a width substantially equal to the distance between said driving bands, said screen having end portions resiliently engaged with said projections in a detachable manner so as to entirely cover said conveyor, and
   (d) a comb-type wiper having a plurality of notches, said notches having a size corresponding to the length and width of said projections, a top end of said wiper contacting said pulley above water level in a tangential direction.

2. An endless belt conveyor as claimed in claim 1, wherein each of said pulleys is a sprocket wheel and each of said driving bands is a flexible wrapping band engageable with sprocket teeth of said sprocket wheel.

* * * * *